Jan. 24, 1939.  W. C. MacFADDEN  2,144,885

MOUNTING BRACKET

Filed Feb. 25, 1936

Inventor:
Wilford C. MacFadden
by Walter J. Jones
Atty.

Patented Jan. 24, 1939

2,144,885

UNITED STATES PATENT OFFICE 2,144,885

MOUNTING BRACKET

Wilford C. MacFadden, Philadelphia, Pa., assignor to United-Carr Fastener Corporation, Cambridge, Mass., a corporation of Massachusetts Application February 25, 1936, Serial No. 65,657

4 Claims. (Cl. 24—73)

My invention aims to provide improvements in mounting brackets, such as are used for securing electrical units to a support, and for installations of the same.

Referring to the drawing, which illustrates preferred embodiments of my invention:—

One of the objects of my invention is to provide a mounting bracket for securing an electrical or the like unit to a support which is so constructed and arranged that it may be attached to supports of varying thicknesses.

Figure 1:
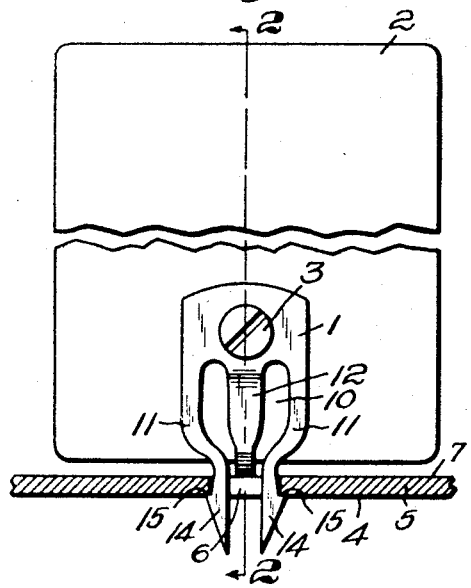
Fig. 1 is a fragmentary plan view of an electrical installation showing a shield can or a condenser, coil or like, such as used in a radio set, secured to a support by means of my improved mounting brackets.
Figure 2:
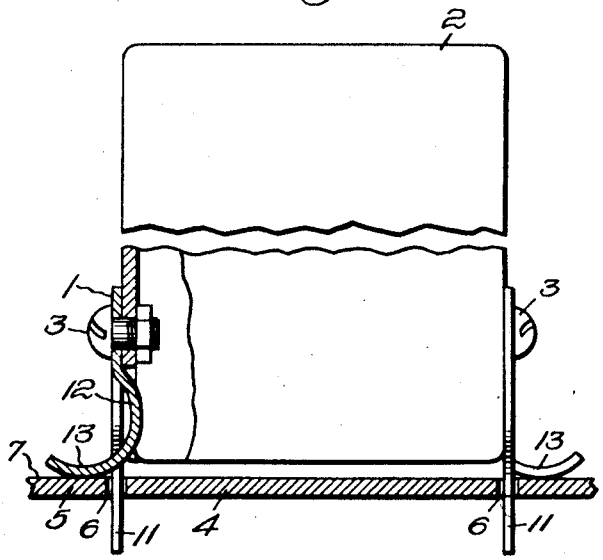
Fig. 2 is a fragmentary section taken on the line 2—2 of Fig. 1.

Other uses and objects of my invention will be apparent from consideration of the following description. Referring first to the embodiment of my invention, as illustrated in Figs. 1 and 2, I have shown my improved mounting bracket 1 having one end rigidly secured to an electrical unit, such as the device 2, which may be a coil, a condenser or the like, by an attaching means, such as the nut and screw means 3. The other end of the bracket 1 is shown in snap fastener engagement with the undersurface 4 of a relatively thin support 5 which is provided with apertures 6 at predetermined points thereon to receive the attaching end of the bracket. A spring arm portion 12, formed integral with the bracket 1, is in spring engagement with the upper surface 7 of the support.

Figure 3:
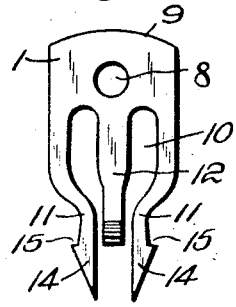
Fig. 3 is a front view of the mounting bracket shown in Fig. 1.
Figure 4:
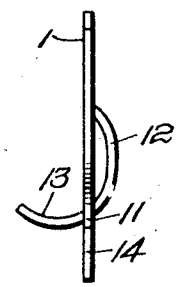
Fig. 4 is a side view of the bracket shown in Fig. 3.
Figure 5:
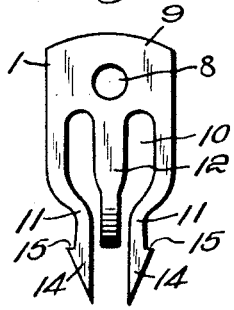
Fig. 5 is a rear view of the bracket shown in Fig. 3.
Figure 6:
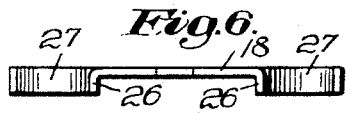
Fig. 6 is an end view of a modified form of the mounting bracket.

Referring specifically to the mounting bracket 1, I have illustrated in Figs. 3–5 a one-piece bracket member made from a strip of relatively thin sheet metal. An aperture 8 is provided at one end 9 to receive an attaching member, such as a screw, for securing the bracket to the unit with which it is to be assembled. The opposite end of the bracket is cut out, as at 10, providing a pair of yieldable arm portions 11—11 which converge toward each other at their lower ends. The spring arm 12 is formed integral with the end 9 and extends downwardly therefrom between the yieldable portions 11—11. The arm 12, as best illustrated in Figs. 2 and 4, curves inwardly out of the plane of the yieldable portions on one side thereof and then outwardly through the plane to form a bearing portion 13 adjacent to the free end of the arm and located on the other side of the yieldable portions from the inwardly-curved part of the arm.

In my preferred form the outer edges of the material adjacent to the free ends of each of the yieldable portions 11—11 are shaped and arranged to provide a head portion 14, having a camming surface for forcing the yieldable arms toward each other, and a shoulder portion 15.

When the parts of the installation are assembled together, the end of the bracket having the aperture 8 is first rigidly secured to the unit 2 by the screw means 3. The screw passes through the aperture 8 and an aperture 16 in the unit casing, after which a nut is secured therewith for holding the parts in assembled relation, as illustrated in Fig. 2. I do not wish, however, to be limited by the particular method of attaching the parts together which I have recited above because other means, such as a rivet pressed from the end 9, would provide a satisfactory fastening device in many cases. After the plate is secured to the unit, the yieldable arms are moved into the aperture 6 by a direct axial movement and as the apertures are made small enough so as to cause the material surrounding the same to engage the cammed surface of the head portion 14, the converging ends of the yieldable portions 11—11 move toward each other permitting the arms to extend through the aperture until the head portions 14 have passed entirely through the aperture. After this action, the arm portions 11—11 spring back toward normal position enabling the shoulders 15 to engage the material of the undersurface 4 of the support.

At the time that the head portions 14 are first inserted into the aperture 6, the lowermost surface of the portion 13 adjacent to the free end of the arm 12 bears upon the upper surface 7 of the support due to the fact that the portion 13 is originally constructed to be disposed in predetermined position relative to the head portions 14. As the head portions 14 are moved through the aperture 6 so that the camming surfaces engage the walls surrounding the aperture, the portion 13 will be forced in an upward direction, and as the heads are moved into final position with the shoulders 15 engaging and locking with the undersurface of the support, the portion 13 will press tightly against the support thereby engaging in a spring contact the upper surface 4$^a$ of the support (Figs. 1 and 2) and cooperating with the shoulders 15—15 to hold the bracket firmly in place. The bracket is now located in snap fastener engagement with the support and may be separated therefrom only by squeezing together the lowermost ends of the yieldable portions 11—11. The arm 12 is made sufficiently yieldable so that the brackets may be attached to supports having varying thicknesses, and a satisfactory steadying means for the unit is provided due to the fact that when the brackets are assembled with any one of the supports having varying thicknesses, the mounting brackets are in contact engagement with both sides of the support.

Figure 7:
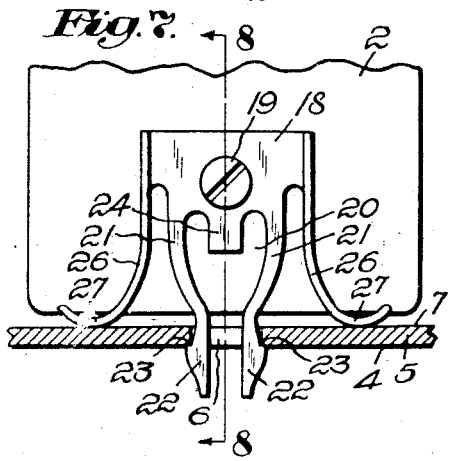
Fig. 7 is a fragmentary plan view of an electrical installation showing a part secured to a support by means of my modified form of mounting bracket.
Figure 8:
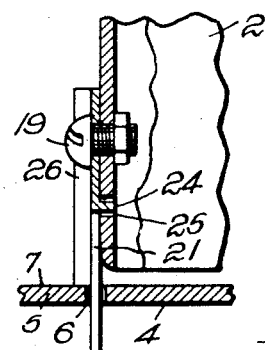
Fig. 8 is a fragmentary section taken on the line 8—8 of Fig. 7.
Figure 9:
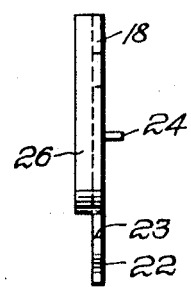
Fig. 9 is a side view of the bracket shown in Figs. 6–8.

In Figs. 6–9 I have shown a modified form of mounting bracket for use in connection with an electrical unit substantially as shown and described in the first form of my invention. The bracket is preferably provided with an aperture 17 at an end 18 to receive a screw 19 for attaching the bracket to the unit, in the manner described, in connection with the first form of my invention. The opposite end of the bracket is cut out, as at 20 (Fig. 7) to form the yieldable arm portions 21—21 which are provided with head portions 22 at their free ends. The head portions 22 are similar in construction to the heads 14 of the first form and operate in the same manner to engage shoulders 23 with the undersurface 4 of the support (Fig. 7). A lug 24 is formed integral with the material of the end 18 and disposed between the yieldable portions 21—21. This lug includes a portion bent at substantially right angles to the plane of the bracket and extending into an aperture 25 in the unit casing, as shown in Fig. 8, thereby preventing any rotation of one part relative to another. Spring arms 26—26 extend downwardly from the end 18 and, in my preferred form, are disposed on opposite sides of the yieldable portions 21—21 (Fig. 7). The arms 26—26 are formed of flat strips of metal, each of which is integral with the material adjacent to opposite edges of the end 18 and disposed with the flat surface of each at substantially right-angular relation thereto. The arms continue beyond the end 18 and curve laterally away from the yieldable portions 21 with the flat surface of each in substantially perpendicular relation to the plane of the bracket. The arms are curved more abruptly at a point near the free ends to form a bearing part 27.

When the camming surface of the head portions 22 engage the walls surrounding the aperture 6, during attachment of the unit to the support, a portion of each of the parts 27 engage the upper surface 7 of the support and are forced upwardly until the head portions 22 have passed entirely through the aperture 6 and the shoulders 23 are in engagement with the undersurface 4 of the support. At this time the part 27 expands as a result of the spring action in the respective arms 26—26 to engage the support in a spring contact (Fig. 7) in substantially the same manner as illustrated and described in connection with the part 13 of the first form of bracket. The brackets are now firmly secured with the support and provide an excellent steadying means for the unit which they carry as they have firm contacting engagement with each side of the support. The second form of mounting bracket, as described, is as adaptable as the first form for attachment to supports which vary in thickness.

By the use of my improved mounting brackets, I have made it possible for electrical units to be engaged with, and disengaged from, a support by an efficient means capable of direct axial operation with the result that assembly and disassembly of the parts are carried out with a minimum of labor. Furthermore, my improved mounting brackets are of such simple construction that they are capable of being manufactured in large quantities at small expense.

Although I have illustrated and described preferred embodiments of my invention, I do not wish to be limited thereby, because the scope of my invention is best set forth in the following claims.

I claim:

1. A mounting bracket of the class described having mounting means adjacent to one end, the other end having yieldable portions movable toward and away from each other, said yieldable portions having laterally-extending shoulder portions, and a spring arm integral with said first end, said arm having a support-engaging portion movable away from said shoulders against the spring tension of said arm, and said shoulders and said support-engaging portion of said arm cooperating to contact opposed surfaces of a support.

2. A mounting bracket of the class described having mounting means adjacent to one end, the other end having yieldable portions movable toward and away from each other, said yieldable portions having laterally-extending shoulder portions, a pair of spring arms integral with said bracket disposed on opposite sides of said bracket, said arms curving laterally away from each other and having support-engaging portions movable away from said shoulders against the spring tension of said respective arms, said shoulders and said support-engaging portions of said arms cooperating to contact opposed surfaces of a support.

3. A mounting bracket of the class described comprising a flat sheet metal body portion having mounting means adjacent to one end, the other end being divided longitudinally of the bracket to provide a pair of yieldable portions movable toward and away from each other, said yieldable portions having laterally-extending shoulder portions, and a pair of spring arms integral with said bracket disposed on opposite sides of said body portion, said arms curving laterally away from each other and having support-engaging portions movable away from said shoulders against the spring tension of said respective arms, said arms having broad surfaces disposed in substantially perpendicular relation to the plane of said body portion, and said shoulders and said support-engaging portions cooperating to contact opposed surfaces of a support.

4. A mounting bracket of the class described having mounting means adjacent to one end, the other end having a pair of yieldable portions movable toward and away from each other, said yieldable portions having laterally-extending shoulder portions, and a spring arm integral with said first end, said arm having a support-engaging portion located in a plane passing between said pair of yieldable portions and being movable away from said shoulders against the spring tension of said arm, and said shoulders and said support-engaging portion of said arm cooperating to contact opposed surfaces of a support.

WILFORD C. MacFADDEN.